July 7, 1970 YASUO TAKAHASHI 3,519,333
HIGH RESOLUTION PHOTOGRAPHIC OBJECTIVE COMPRISING SEVEN LENSES
Filed March 27, 1968
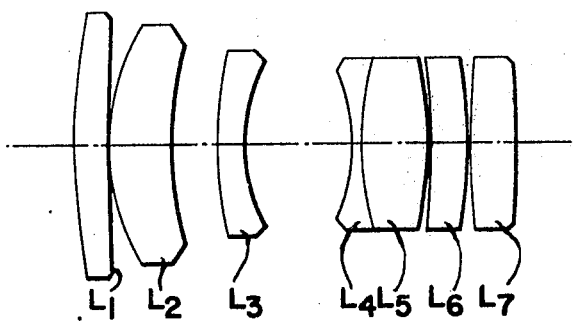
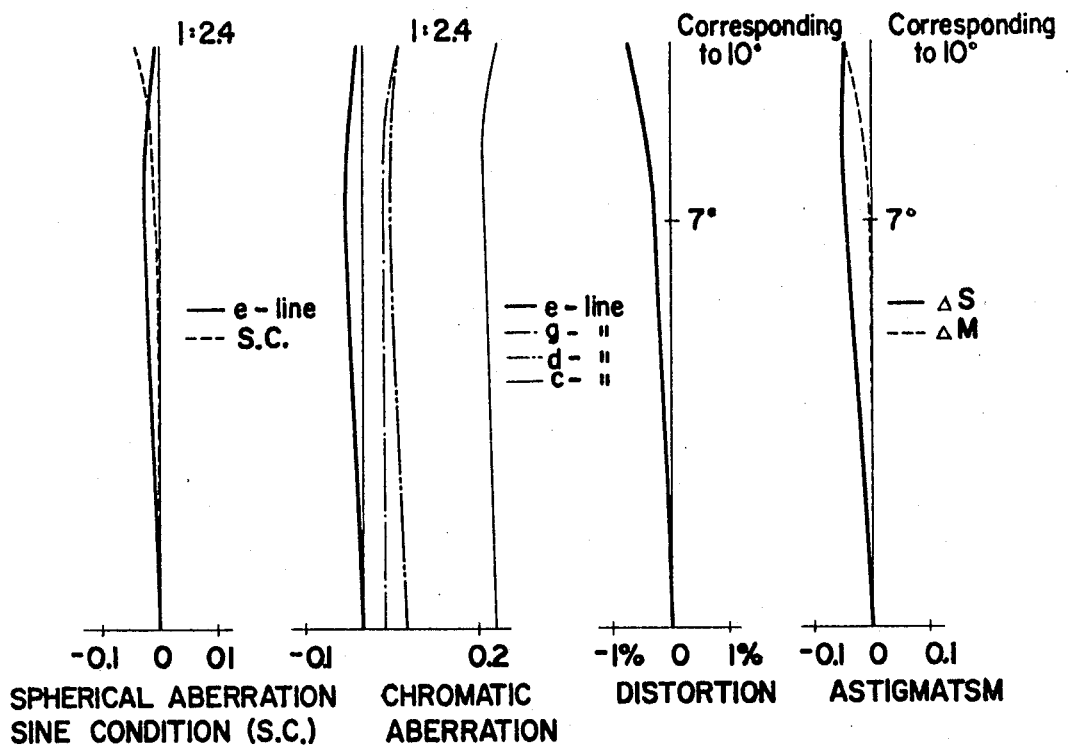
INVENTOR
YASUO TAKAHASHI
BY Stanley Wolder
ATTORNEY 3,519,333
HIGH RESOLUTION PHOTOGRAPHIC OBJECTIVE COMPRISING SEVEN LENSES
Yasuo Takahashi, Tokyo-to, Japan, assignor to Asahi Kogaku Kogyo Kabushiki Kaisha, Tokyo-to, Japan, a corporation of Japan
Filed Mar. 27, 1968, Ser. No. 716,475
Claims priority, application Japan, Apr. 28, 1967, 42/27,293
Int. Cl. G02b 9/62
U.S. Cl. 350—215                                   1 Claim

ABSTRACT OF THE DISCLOSURE

A photographic objective of focal length F includes seven lenses designated as the first to seventh lens respectively and possesses the following dimensions and relationships:

$$F/1.5 < F_{1,2} < F/1.3$$
$$F/0.4 < F_{1,2,3} < F/0.25$$
$$0.06F < d_4 < 0.1F$$
$$0.15 < n_5 - n_4 < 0.25$$
$$0.25F < |r_7| < 0.45F, \quad r_7 < 0$$
$$1.72 < n_1 < 1.85, \quad V_1 > 45$$
$$1.72 < n_2 < 1.85, \quad V_2 > 45$$
$$1.72 < n_5 < 1.85, \quad V_5 > 37$$
$$1.72 < n_6 < 1.85, \quad V_6 > 37$$
$$1.72 < n_7 < 1.85, \quad V_7 > 37$$

wherein $F_{1,2}$ and $F_{1,2,3}$ are the resultant focal lengths of the first two and the first three lenses respectively, $r_7$ is the radius of curvature of the front face of the fourth lens, $d_4$ is the axial separation between the second and third lenses, $n_n$ is the index of refraction of the subscript designated lens and $V_n$ is the Abbe value of the subscript designated lens.

BACKGROUND OF THE INVENTION

The present invention relates generally to improvements in objective lens systems and it relates particularly to an improved highly corrected photographic objective lens system characterized by its substantial approach or correspondence to Rayleigh's limit.

Many conventional photographic objective lens systems are intended for a relative aperture or included angle which is large for the number of lenses employed. These objective lens systems generally leave much to be desired and are characterized by an aberration which provides a resolution far short of Rayleigh's limit or criterion.

SUMMARY OF THE INVENTION

It is a principal object of the present invention to provide an improved lens system.

Another object of the present invention is to provide an improved photographic objective lens system.

Still another object of the present invention is to provide a highly corrected photographic objective lens system of excellent resolution.

A further object of the present invention is to provide an improved highly corrected photographic objective lens system of a relative aperture or included angle which is large for the number of lenses employed.

Still a further object of the present invention is to provide a highly corrected photographic objective lens system of the above nature which is characterized by its correspondence to Rayleigh's limit or criterion.

The above and other objects of the present invention will become apparent from a reading of the following description taken in conjunction with the accompanying drawing which illustrates a preferred embodiment thereof.

In a sense the present invention contemplates the provision of an objective lens system comprising seven lenses designated successively from the front lens to the rear lens as the first to the seventh lens respectively and possessing the dimensions and relationships which satisfy the following sets of conditions:

(1)     $F/1.5 < F_{1,2} < F/1.3$
(2)     $F/0.4 < F_{1,2,3} < F/0.25$
(3)     $0.06F < d_4 < 0.1F$
(4)     $0.15 < n_5 - n_4 < 0.25$
(5)     $0.25F < |r_7| < 0.45F, \quad r_7 < 0$
(6)     $1.72 < n_1 < 1.85, \quad V_1 > 45$
         $1.72 < n_2 < 1.85, \quad V_2 > 45$
(7)     $1.72 < n_5 < 1.85, \quad V_5 > 37$
         $1.72 < n_6 < 1.85, \quad V_6 > 37$
         $1.72 < n_7 < 1.85, \quad V_7 > 37$ wherein F, $F_{1,2}$ and $F_{1,2,3}$ are the resultant focal lengths of the objective lens system, the first two lenses and the first three lenses respectively; $r_7$ is the radius of curvature of the front face of the fourth lens, $d_4$ is the axial separation between the second and third lenses, $n_n$ is the index of refraction of the subscript designated lens and $V_n$ is the Abbe value of the subscript designated lens.

Advantageously, a pair of successive lenses, the fourth and fifth lenses, have mating confronting faces which are cemented together to form a unitary lens group, and the other lenses are separate individual elements. Further, advantageously the first lens is positive and has a front face of greater curvature than its rear face; the second lens is a positive meniscus lens with a convex front face; the third lens is a negative meniscus lens with a convex front face; the fourth and fifth lenses which are a cemented group have mating confronting faces which are negative and positive respectively; and the sixth and seventh lenses are both positive.

In order to hold the aberration at a value corresponding to Rayleigh's limit within the range of a specified included angle, the Petzval sum must be diminished as far as possible. The Conditions 6 and 7 set forth above function to reduce the Petzval sum as well as various aberrations. At times, a greater power is given to each lens in order to diminish the Petzval sums. According to the Condition 1 however, a weaker power is given to the first two lenses so as to reduce the aberrations. The Abbe value limitations set forth in Condition 6 function, in association with the divergence due to the third lens, to highly correct chromatic aberration without increasing the power of the positive lens and in accordance with the Conditions 1 and 2. The Condition 3 is association with the Condition 2 constitutes the main objective conditions and function to reduce the Petzval sum. The Conditions 4 and 5 are required for the correction of aberrations, the Condition 4 functioning to prevent aggravation of coma aberration in the oblique ray bundles and the Condition 5 functions to highly correct spherical aberrations under other influences.

The photographic objective lens system is highly corrected and under relative apertures or included angles which are large for the number of lenses employed performs substantially at Rayleigh's limit.

BRIEF DESCRIPTION OF THE DRAWINGS

FIG. 1 is a longitudinal sectional view of an objective lens system embodying the present invention;

FIG. 2 is a set of aberration curves of a specific example of the present invention.

DESCRIPTION OF THE PREFERRED EMBODIMENT

Referring now to the drawing which illustrates a preferred embodiment of the present invention, the improved objective lens system includes seven lenses designated successively $L_1$, $L_2$ ... $L_7$ respectively, the first lens $L_1$ being the front lens directed toward the object and the last lens $L_7$ being the rear lens directed toward the image plane.

The front lens $L_1$ is a positive lens with a convex front face of greater curvature than its rear face, and having a thickness $d_1$, a refractive index $n_1$, an Abbe value $V_1$ a front face of radius of curvature $r_1$ and a rear face of radius of curvature $r_2$. The second lens $L_2$ is a positive meniscus lens spaced a distance $d_2$ from lens $L_1$, and has a thickness $d_3$, an index of refraction $n_2$, an Abbe value $V_2$, a convex front face of radius of curvature $r_3$ and a concave rear face of radius of curvature $r_4$. The third lens $L_3$ is a negative meniscus lens spaced a distance $d_4$ from lens $L_2$ and has a thickness $d_5$, an index of refraction $n_3$, an Abbe value $V_3$, a convex front face of radius of curvature $r_5$ and a concave rear face of radius of curvature $r_6$.

The fourth and fifth lenses $L_4$ and $L_5$ are cemented together along their mating confronting faces. The fourth lens $L_4$ is a negative lens spaced a distance $d_6$ from lens $L_3$ and has a thickness $d_7$, an index of refraction $n_4$, an Abbe value $V_4$, a concave front face of radius of curvature $r_7$ and a concave rear face of radius of curvature $r_8$. The fifth lens $L_5$ is a positive lens spaced a zero distance $d_8$ from lens $L_4$, and has a thickness $d_9$, an index of refraction $n_5$, an Abbe value $V_5$, a convex front face having a radius of curvature $r_9$ equal to $r_8$ and mating and cemented to the rear face of lens $L_4$, and a convex rear face of radius of curvature $r_{10}$. The sixth lens $L_6$ is a positive lens spaced a distance $d_{10}$ from lens $L_5$, and has a thickness $d_{11}$, an index of refraction $n_6$, an Abbe value $V_6$, a concave front face of radius of curvature $r_{11}$ and a convex rear face of radius of curvature $r_{12}$. The seventh lens $L_7$ is a positive lens spaced from lens $L_6$ a distance $d_{12}$ and has a thickness $d_{13}$, an index of refraction $n_7$, an Abbe value $V_7$, a front face of radius of curvature $r_{13}$ and a rear face of radius of curvature $r_{14}$.

The following table sets forth the information and data of a specific example of an objective lens system having a focal length $F=100$ mm., it being noted that the following is given only by way of example and is not intended to limit the scope of the invention:

| | | | |
|---|---|---|---|
| $r_1=133.920$ | $d_1=9.45$ | $n_1/V_1$ | 1.77621/49.6 |
| $r_2=556.454$ | $d_2=0.27$ | | |
| $r_3=58.995$ | $d_3=14.85$ | $n_2/V_2$ | 1.77621/49.6 |
| $r_4=97.128$ | $d_4=10.39$ | | |
| $r_5=106.920$ | $d_5=6.95$ | $n_3/V_3$ | 1.76861/26.5 |
| $r_6=38.169$ | $d_6=24.97$ | | |
| $r_7=-43.875$ | $d_7=2.70$ | $n_4/V_4$ | 1.59664/35.8 |
| $r_8=91.800$ | $d_8=0.00$ | | |
| $r_9=91.800$ | $d_9=16.20$ | $n_5/V_5$ | 1.77621/49.6 |
| $r_{10}=-78.226$ | $d_{10}=0.27$ | | |
| $r_{11}=-267.000$ | $d_{11}=9.45$ | $n_6/V_6$ | 1.77621/49.6 |
| $r_{12}=-117.160$ | | | |
| $r_{13}=267.000$ | $d_{12}=0.27$ | | |
| $r_{14}=-452.551$ | $d_{13}=10.80$ | $n_7/V_7$ | 1.81081/40.7 |

The data in the above table is designated and identified as previously set forth in connection with the description of the lens system of FIG. 1. The thicknesses and lens spacings $d_n$ are measured along the lens system optical axis, the lens spacing being between the confronting faces of adjacent lenses.

The high optical quality and low aberration of the specific lens system given in the above example at relatively high apertures or high included angles is clearly demonstrated in the curves shown in FIG. 2 which illustrate the curves of spherical aberration and sine condition, chromatic aberration, distortion, and astigmatism, respectively, of the specific example.

While there has been described and illustrated a preferred embodiment of the present invention, it is apparent that numerous alterations, omissions and additions may be made without departing from the spirit thereof. Thus, one skilled in the art, may readily modify the dimensions and parameters set forth in the specific example and maintain the Conditions 1 to 7 and thereby remain within the range and scope of the present invention.

What is claimed is:

1. An objective lens system comprising seven lenses herein successively identified as the first to the seventh lens respectively, and having substantially the following values:

| | | | |
|---|---|---|---|
| $r_1=133.920$ | $d_1=9.45$ | $n_1/V_1$ | 1.77621/49.6 |
| $r_2=556.454$ | $d_2=0.27$ | | |
| $r_3=58.995$ | $d_3=14.85$ | $n_2/V_2$ | 1.77621/49.6 |
| $r_4=97.128$ | $d_4=10.39$ | | |
| $r_5=106.920$ | $d_5=6.95$ | $n_3/V_3$ | 1.76861/26.5 |
| $r_6=38.169$ | $d_6=24.97$ | | |
| $r_7=-43.875$ | $d_7=2.70$ | $n_4/V_4$ | 1.59664/35.8 |
| $r_8=91.800$ | $d_8=0.00$ | | |
| $r_9=91.800$ | $d_9=16.20$ | $n_5/V_5$ | 1.77621/49.6 |
| $r_{10}=-78.226$ | $d_{10}=0.27$ | | |
| $r_{11}=-267.000$ | $d_{11}=9.45$ | $n_6/V_6$ | 1.77621/49.6 |
| $r_{12}=-117.160$ | | | |
| $r_{13}=267.000$ | $d_{12}=0.27$ | | |
| $r_{14}=-452.551$ | $d_{13}=10.80$ | $n_7/V_7$ | 1.81081/40.7 | wherein $r_n$ is the radius of curvature of the $n$th lens face and $d_n$ is the axial distance between the $n$th lens face and the $n+1$ lens face, said lens faces being successively consecutively designated 1, 2, 3 ... $n$ from the front face of the first lens; $n_n$ is the index of refraction of the $n$th lens and $V_n$ is the Abbe value of the $n$th lens.

References Cited

UNITED STATES PATENTS 2,887,009  5/1959  Altman et al. _____ 350—215
3,350,157  10/1967  Solisch et al. _____ 350—215 X JOHN K. CORBIN, Primary Examiner U.S. Cl. X.R.
350—176